(12) United States Patent
Keller

(10) Patent No.: US 6,931,519 B1
(45) Date of Patent: Aug. 16, 2005

(54) METHOD AND APPARATUS FOR RELIABLE BOOTING DEVICE

(75) Inventor: Leslie N. Keller, Houston, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 696 days.

(21) Appl. No.: 09/648,965

(22) Filed: Aug. 25, 2000

(51) Int. Cl.⁷ .................... G06F 15/177; H02H 3/05
(52) U.S. Cl. ................ 713/1; 713/2; 714/1
(58) Field of Search ............... 713/1, 2; 714/1

(56) References Cited

U.S. PATENT DOCUMENTS

| | | | | |
|---|---|---|---|---|
| 5,708,776 A | * | 1/1998 | Kikinis ...................... | 714/55 |
| 5,832,222 A | * | 11/1998 | Dziadosz et al. ............ | 709/216 |
| 6,105,130 A | * | 8/2000 | Wu et al. .................... | 713/2 |
| 6,366,965 B1 | * | 4/2002 | Binford et al. ............... | 710/8 |
| 6,477,629 B1 | * | 11/2002 | Goshey et al. .............. | 711/162 |
| 6,591,376 B1 | * | 7/2003 | VanRooven et al. ......... | 714/36 |
| 6,651,165 B1 | * | 11/2003 | Johnson ...................... | 713/2 |
| 6,754,818 B1 | * | 6/2004 | Lee et al. .................... | 713/2 |
| 6,757,841 B1 | * | 6/2004 | Gitlin et al. ................. | 714/7 |

FOREIGN PATENT DOCUMENTS

| | | | | | |
|---|---|---|---|---|---|
| JP | | 03294923 A | * | 12/1991 | ............ G06F/9/06 |

OTHER PUBLICATIONS

"A Data Backup Method for Computers having Removable HDDs". 2000. IBM technical Disclosure Bulletin. Issue 437. pp. 1682.*

* cited by examiner

*Primary Examiner*—Lynne H. Browne
*Assistant Examiner*—Eric Chang
(74) *Attorney, Agent, or Firm*—Robert C. Kowert; Meyertons, Hood, Kivlin, Kowert & Goetzel, P.C.

(57) ABSTRACT

The present invention is a method and apparatus for a reliable boot device. The invention comprises a plurality of disk drive which appear to be the same logical unit (LUN) to the computer. Any disk can serve as the boot drive, and any remaining disk serves as a backup boot drive. The LUN is mirrored, which means information written to any disk is automatically written to all disks. In the event of failure of one of the disks, the invention automatically indicates that one disk has led and switches to using all disks which have not failed. A technician can remove the failed disk and replace it with a new disk while the invention is still in use without interruption in the usability of the computer. Once the new disk is placed in the invention, the information on the remaining disks is automatically mirrored to the replacement disk.

30 Claims, 8 Drawing Sheets

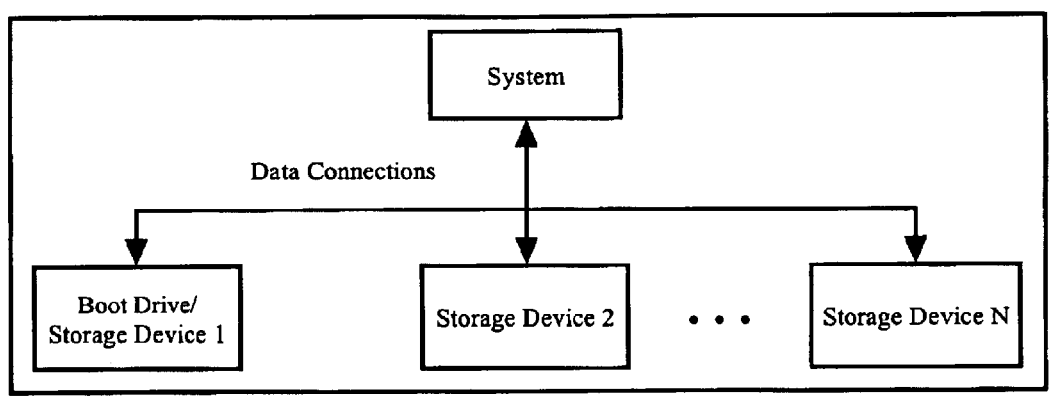
Figure 1A: Computer Data Storage Architecture (Prior Art)

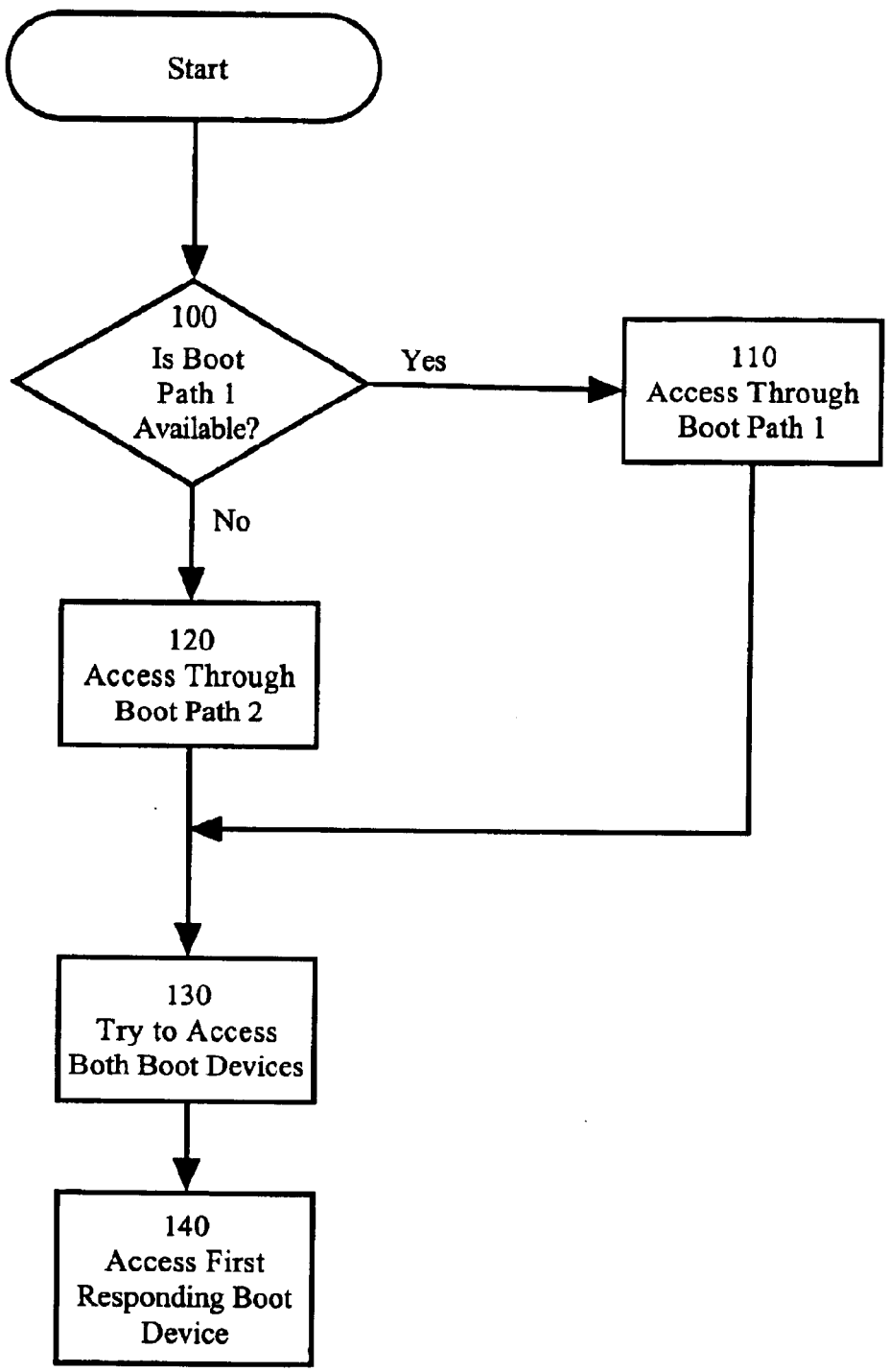
Figure 1B: Invention Data Access Process

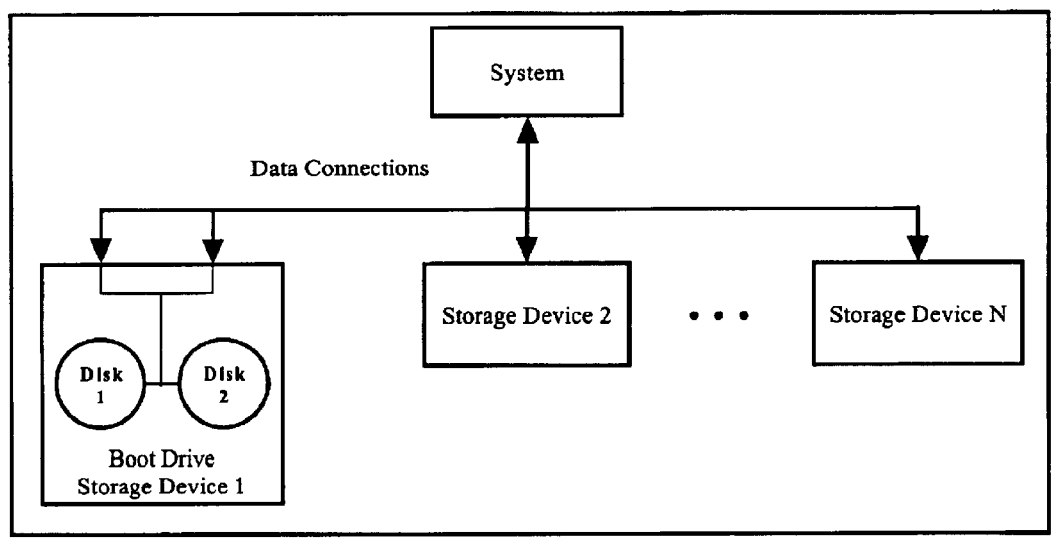
Figure 2: Computer Data Storage Architecture

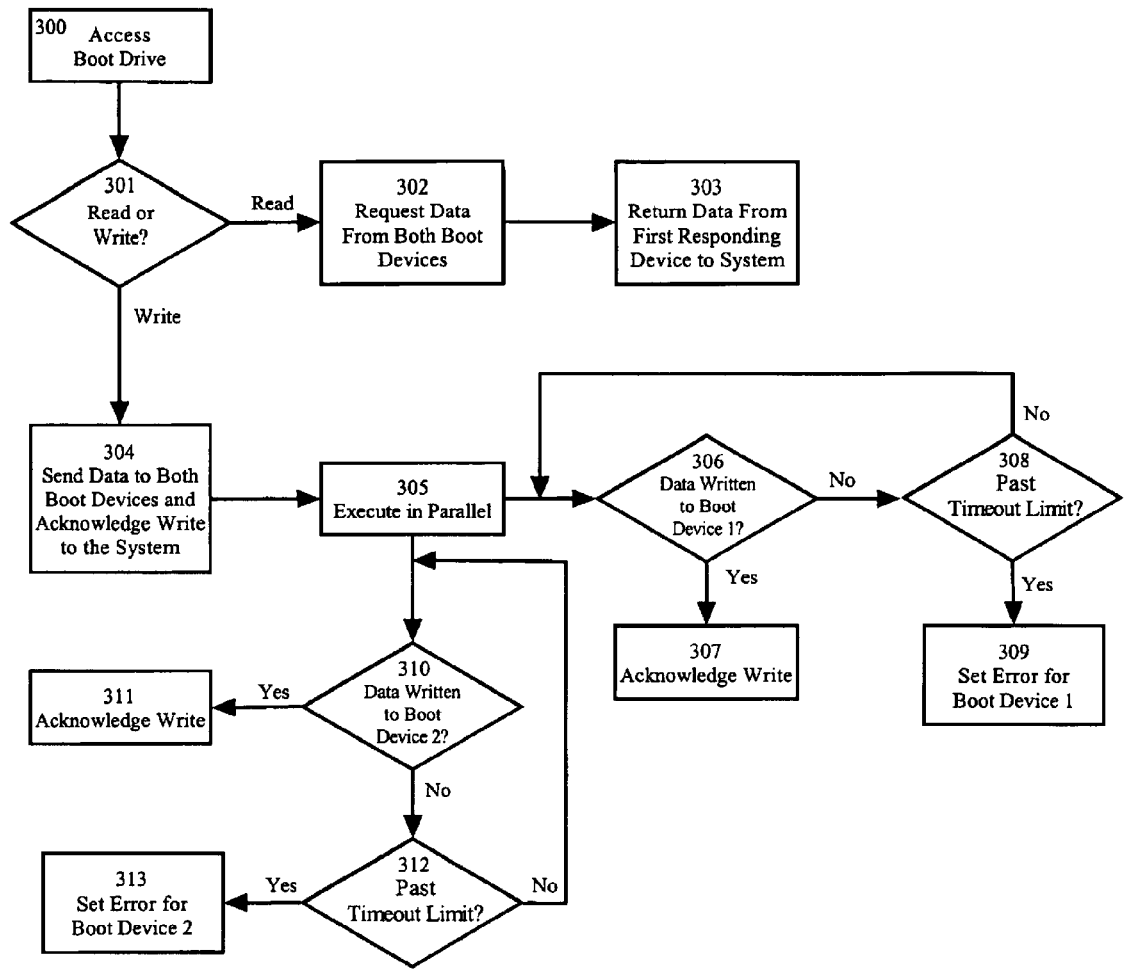
Figure 3: Invention Function When Accessing Data

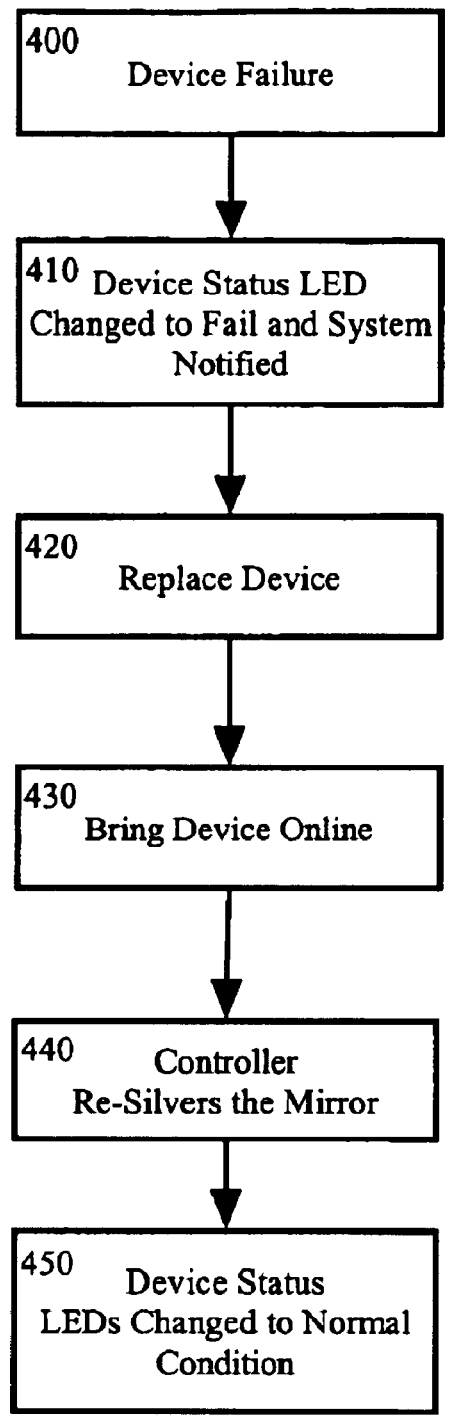
Figure 4: Invention Recovery from Failed Disk

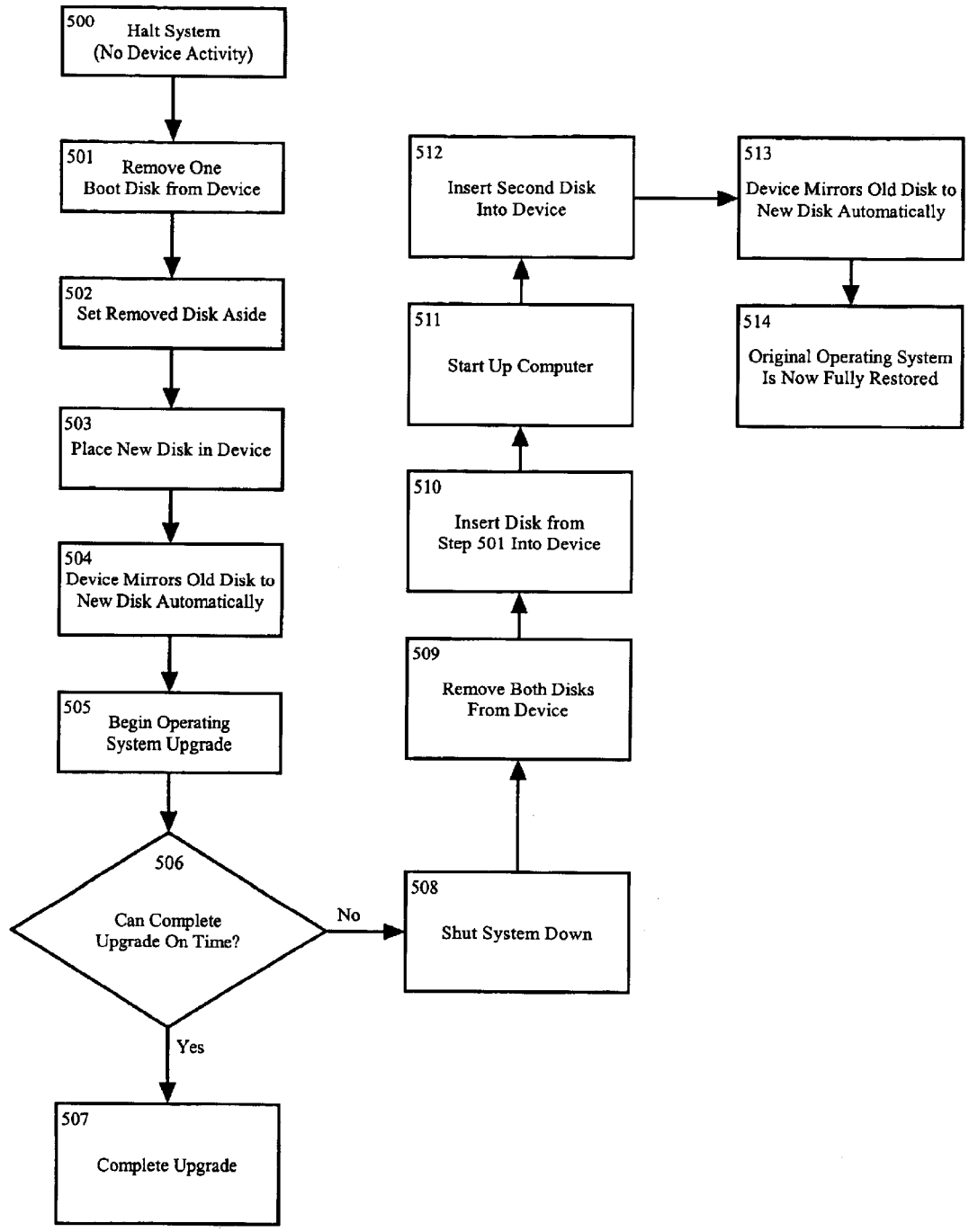
Figure 5: Procedure for Operating System Upgrade With Invention

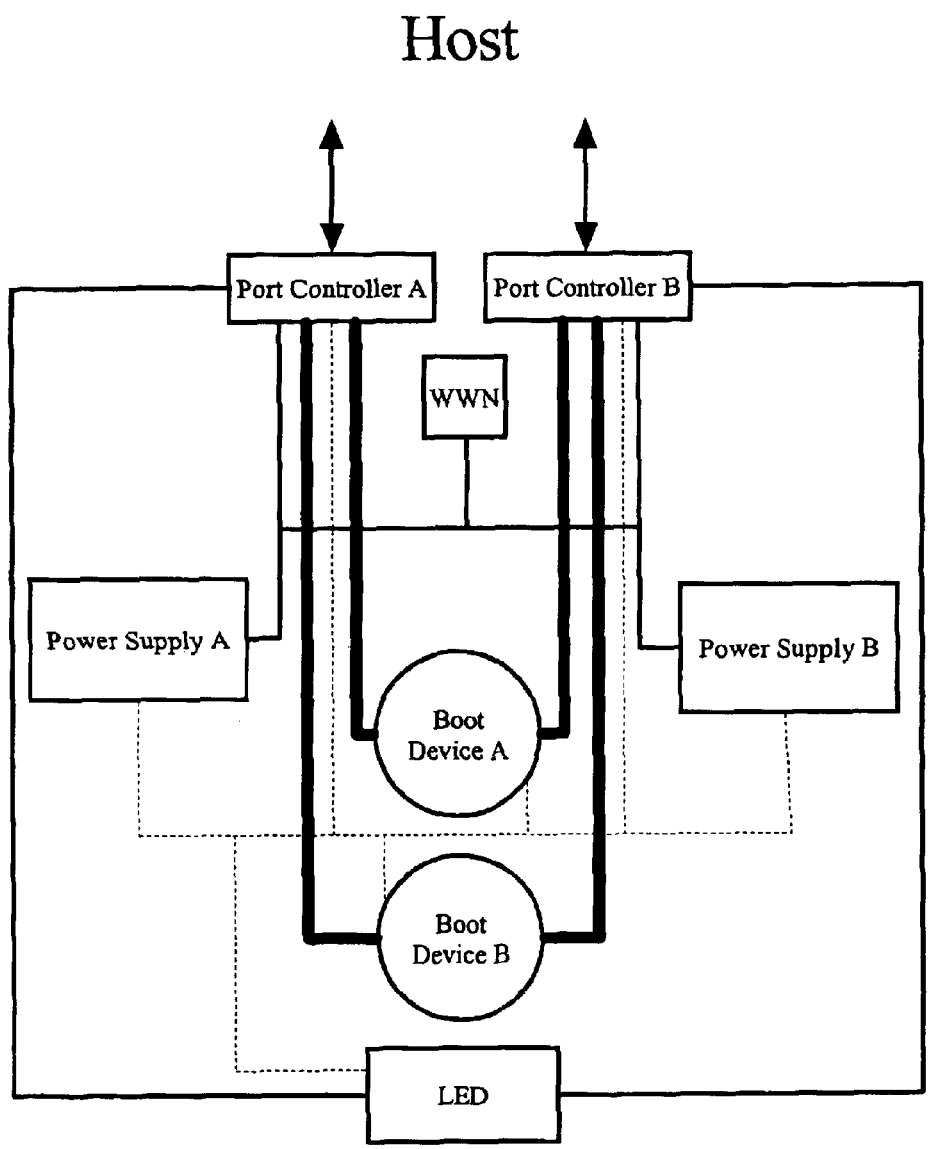
Figure 6: One Embodiment of the Present Invention

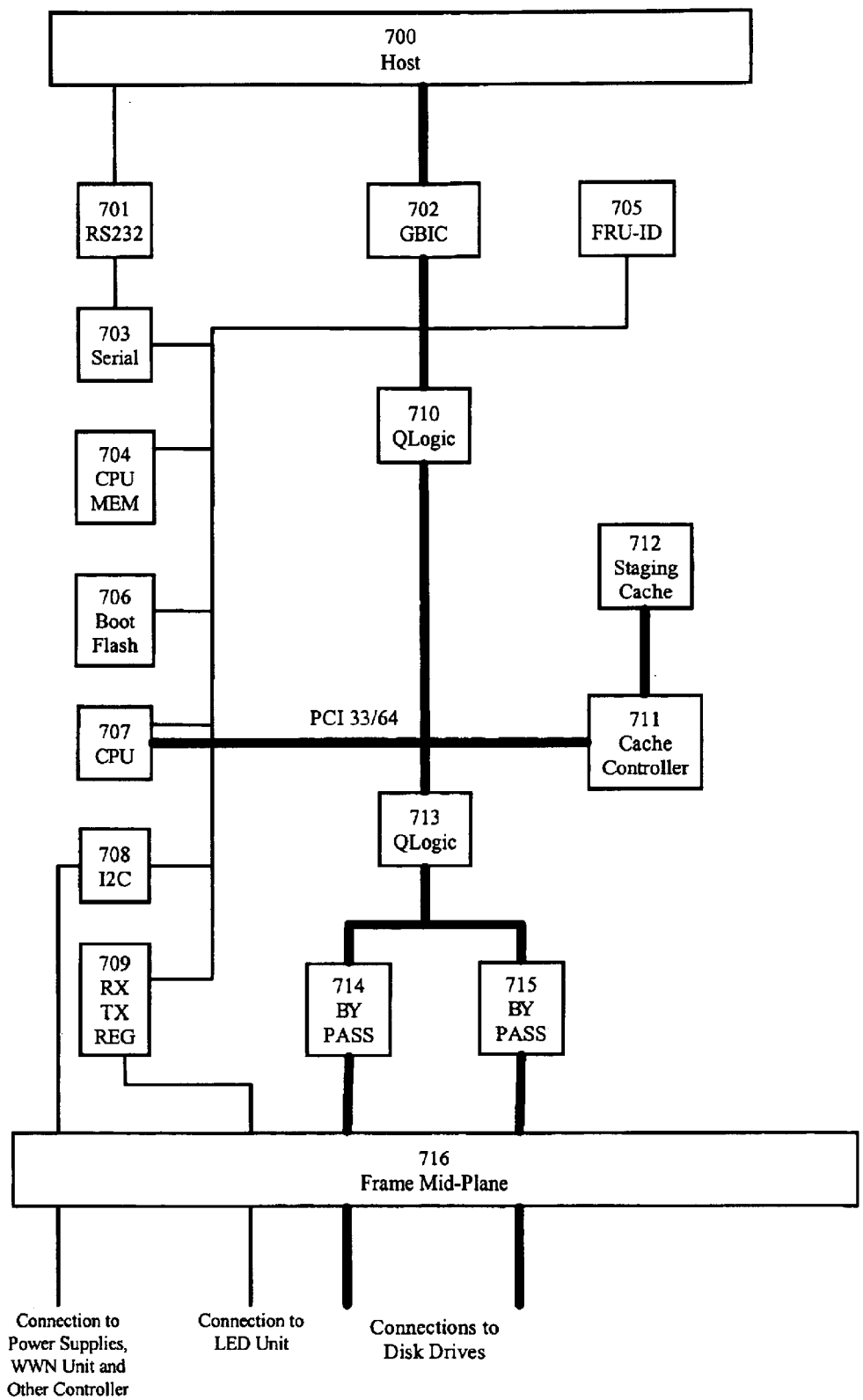
Figure 7: One Embodiment of a Port Controller

METHOD AND APPARATUS FOR RELIABLE BOOTING DEVICE

BACKGROUND OF THE INVENTION

1. Field of the Invention

The present invention is related to the field of data storage, and in particular to a method and apparatus for a reliable booting device.

2. Background Art

Computer systems typically make use of one or more storage devices, such as hard disks or tape drives, to store information. This stored information consists of both data generated by programs and the programs themselves. These programs are loaded into a processor, which carries out all the instructions which make the programs run. Sometimes a storage device fails and the computer becomes unusable. This is because the processor is unable to see the data or instructions on that failed device, and hence, cannot continue to execute instructions. For many computer users, it is both inconvenient and expensive to lose access to the data on a storage device for any length of time. Current schemes for preventing or recovering from such failures do not work well in all circumstances. This problem can be better understood by a review of computer and storage systems.

FIG. 1A illustrates an example of a possible architecture for a computer. In FIG. 1A, the system (comprised of memory and one or more processors) connects to anywhere from one to N storage devices. Data flows between the system and the storage devices via those connections. All computing, including the running of programs, takes place in a processor. A processor is controlled by one main program called an operating system. Conventional operating systems include Windows, Mac OS and UNIX, for example. All other programs run under the control of the operating system. The operating system is stored on a storage device referred to as a boot drive. In FIG. 1A, storage device 1 is designated as the boot drive. When the computer is started, the operating system must be loaded into a processor from storage device 1 (i.e. the boot drive) before any other program can be used.

When the boot drive fails, the operating system cannot be loaded into a processor which means the computer cannot run any programs. Thus, it is even more important that storage device 1 of FIG. 1A remain operable. Prior art attempts to reduce or eliminate the problem of storage device failure include attempting to recover the data from the device itself, making a tape backup of the device, and utilizing a redundant array of inexpensive disks termed "RAID" technology.

Recovering Data from the Failed Device

Attempting to recover data from the failed device means the user does nothing until a storage device fails. If a device fails, the user sends the device to a technician who attempts to fix the device or retrieve the data from the device and return that data to the user. This method has the advantage that up until a device fails, there is no overhead in computing time and there is no extra hardware or software to buy.

This method, however, has two drawbacks. First, recovery of data by this method is not guaranteed. The device could be damaged to the point that recovery is impossible. If recovery is impossible, the data is lost. The second drawback is that even if the data can be recovered, the process can be very time consuming (on the order of hours, days or weeks). During that time, the data is inaccessible to the computer. If the failed device is the boot drive, this renders the computer useless until the data is recovered or replaced.

Additionally, this method runs into trouble when the operating system is upgraded. Some users rely on the computer operating twenty-four (24) hours a day, seven (7) days a week. Since the computer is not usable while the operating system is being upgraded, such users may have specific time requirements for beginning and ending an operating system upgrade. For example, a business may only wish to have its computer upgraded during an eight (8) hour period on Sunday night, when use is expected to be low.

When an operating system upgrade is started, the computer remains unusable until either the upgrade is completed or the upgrade is abandoned and the original operating system is restored. If only the method of recovering data from failed devices is used, once an operating system upgrade is started, the system cannot be restored to its original state. This is because the old operating system on the storage device is being modified on that device during the upgrade. As a result, the old operating system is no longer recoverable. Thus, if the upgrade cannot be completed in the time specified by the user, the only option is for the upgrade to continue. This results in the computer still being unusable during the time the user was counting on the computer being usable.

Tape Backup

Making a tape backup means copying the data on a device to a tape drive periodically. This method addresses the problem of irretrievably damaged devices by ensuring that a copy of the data exists. If a device fails, the data that was on the device can be restored to a replacement device from the tape backup. While this is an improvement over just retrieving the data from the failed device, it still leaves the data on the failed drive inaccessible to the computer while the recovery is completed. If the device which fails is the boot drive, this can leave the computer useless for several hours while the recovery completes.

Additionally, the tape backup must be made prior to a device failure for the tape to contain a copy of the data on that device. Since making a tape backup is time consuming and slows down the computer, storage devices are backed up to tape on a periodic basis rather than continuously. If a device fails and the data must be restored from the tape backup, all the data which was created more recently than the most recent tape backup is lost.

Tape backup offers more flexibility when performing an operating system upgrade. If it is determined at some point that the upgrade cannot be completed in the time allowed, the old operating system could be restored from the tape backup. However, as mentioned above, restoring from a tape backup can take a considerable amount of time, so the decision to restore from the tape backup in the middle of an operating system upgrade might have to be made several hours before the completion deadline.

RAID Systems

Redundant array of inexpensive disks (RAID) technology attempts to reduce the problem of disk failure by using a plurality of disks coupled together in parallel. Data is broken into chunks and copies are stored on multiple disks. These data chunks may be accessed simultaneously from multiple drives in parallel, or sequentially from a single drive. As a result, if one storage device fails, the data contained on that device can normally be recovered instantly from the redundant copies which are distributed throughout the other disks in the array.

RAID has several disk configurations referred to as RAID levels. Each RAID level has advantages and disadvantages. RAID systems provide techniques for protecting against disk failure. One feature common to the different RAID levels is that a disk (or several disks) stores parity information for data stored in the array of disks. In the case of a disk failure, the parity information stored in the RAID subsystem allows the lost data from a failed disk to be recalculated by RAID software.

RAID technology works very well for recovering from most storage device failures. If the failed device is not the boot drive, the user does not lose access to the data on the failed device since the same data is stored redundantly on another device the user can still access. However, if the failed device is the boot drive, a problem arises. RAID systems rely on RAID software to recover from device failures. This RAID software requires an operating system in order to run. This is a problem because if the boot drive fails, the operating system cannot be loaded, thus making the computer unable to run the RAID software necessary for the RAID system to recover the data on the boot drive. As a result, when a boot drive fails in a RAID system, a highly skilled technician typically takes from six (6) to eight (8) hours to get the operating system and RAID software working in order to restore the computer to a usable state. Since many computer users rely on their computer functioning continuously, these long gaps in the computer's usability are unacceptably costly.

Similarly, because the operating system is unable to run RAID software during an operating system upgrade, the time necessary to restore an operating system to its original state using RAID technology is the same as the time necessary to recover from a boot drive failure. Thus, the problem of operating system upgrades is more severe in RAID systems than in tape backups since the decision of whether to abandon the upgrade must be made six (6) to eight (8) hours before the upgrade completion deadline.

SUMMARY OF THE INVENTION

The present invention is a method and apparatus for a reliable boot device. The invention comprises a plurality of disk drives which appear to be the same logical unit (LUN) to the computer. Any disk can serve as the boot drive, and any remaining disk serves as a backup boot drive. The LUN is mirrored, which means information written to any disk is automatically written to all disks. The mirroring requires no additional computations.

In the event of failure of one of the disks, the invention automatically indicates that one disk has failed and switches to using all disks which have not failed. A technician can remove the failed disk and replace it with a new disk while the invention is still in use. Once the new disk is placed in the invention, the information on the remaining disks is automatically mirrored to the replacement disk. This results in the system recovering from a failure in the boot drive without any interruption in the usability of the computer.

The invention also provides improved operation during an operating system upgrade. When the operating system is upgraded, a technician can first remove one of the boot disks and set it aside. The invention automatically switches to using the remaining boot disk or disks. The technician can then insert a new disk into the device. The invention automatically mirrors the existing data to the new disk. The technician can immediately begin the operating system upgrade. If the upgrade cannot be completed in the time allowed, the technician can restore the old operating system using the disk which was originally set aside. To do that, the technician shuts the system down, removes all disks from the device, inserts the old boot disk which was originally set aside and starts up the system. Since that boot disk is still in the same state it was before the upgrade was started, it starts the computer using the old operating system. A second disk can now be inserted into the device. The old disk mirrors automatically to the new disk, and the system is completely restored to the state it was in before the upgrade began. All of this can be accomplished in minutes, which is an advantage over previous methods.

BRIEF DESCRIPTION OF THE DRAWINGS

These and other features, aspects and advantages of the present invention will become better understood with regard to the following description, appended claims and accompanying drawings where:

FIG. 1A is a block diagram of a prior art computer data storage architecture.

FIG. 1B is a flow diagram of boot device access in accordance with one embodiment of the present invention.

FIG. 2 is a block diagram of a computer data storage architecture in accordance with one embodiment of the present invention.

FIG. 3 is a flow diagram of data access behavior in accordance with one embodiment of the present invention.

FIG. 4 is a flow diagram of the disk failure recovery process in accordance with one embodiment of the present invention.

FIG. 5 is a flow diagram of the improved procedure for operating system upgrades in accordance with one embodiment of the present invention.

FIG. 6 is a block diagram of one embodiment of the present invention.

FIG. 7 illustrates one embodiment of a port controller for use in FIG. 6.

DETAILED DESCRIPTION OF THE INVENTION

The invention is a method and apparatus for a reliable boot device. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

In some computer systems, it is necessary that the computer remain running continuously. Some continuously running computers arc labeled as "mission critical" systems. A mission critical system is a computer system which is necessary for the operation of the entity which owns it. If a mission critical system fails, the entity's activity is slowed or halted as a result. One potential cause of failures in mission critical and other computer systems is a failure in the system's boot drive.

FIG. 2 illustrates how one or more embodiments of the present invention are used in a computer system. In FIG. 2, a system containing memory and one or more processors is connected to 1 to N storage devices. Data flows between the system and the storage devices via those connections. The operating system is stored on a storage device referred to as a boot drive. In FIG. 2, storage device 1 is the boot drive. When the computer is started, the operating system must be loaded into a processor from the boot drive before any other program can be used.

Storage device 1 in FIG. 2 has two ports connecting it to the system as well as two disks (Note that two disks are used by way of example only. The present invention contemplates embodiments with any number of disks). Those two disks are connected in a manner (described in more detail below) such that the system sees them both as one logical unit. Both disks in the invention store a copy of all the data. Additionally, both disks are boot disks, so the computer is able to load the operating system from either disk in the event of a failure of one of the disks.

One or more embodiments of the invention operate in accordance with FIG. 1B. At step 100, it is determined whether boot path 1 is available. If it is, the invention accesses the boot devices through boot path 1 (step 110). If boot path 1 becomes inaccessible at step 100, the invention accesses the boot devices through boot path 2 (step 120). Steps 110 and 120 both lead to step 130, wherein the access is attempted on both boot devices simultaneously. Then, at step 140, the data access is made with the first responding boot device.

Data Operations Reliability

FIG. 3 shows how one embodiment of the invention behaves with regard to read and write accesses. At step 300, the boot device is accessed. At step 301, it is determined whether the access is a read or a write. If it is a read, at step 302, the data is requested simultaneously from both boot drives. At step 303, the data from the first responding disk is returned. If the access is a write, at step 304, the data is sent to both disks and the write is acknowledged to the system. At step 305, two processes are initiated which execute in parallel. The first of the parallel processes is comprised of determining at step 306 whether the data has been written to boot disk 1. If the data has been written, at step 307 a write acknowledgement is sent to the system. If at step 306 it is determined that the data has not been written to boot disk 1, at step 308, it is determined whether the time allowed for the write has expired. If time has expired, at step 309, an error is recorded for boot disk 1 and the process ends. If time has not expired, the process returns to step 306. The second of the parallel processes is comprised of determining at step 310 whether the data has been written to boot disk 2. If the data has been written, at step 311 a write acknowledgement is sent to the system. If at step 310 it is determined that the data has not been written to boot disk 2, at step 312, it is determined whether the time allowed for the write has expired. If time has expired, at step 313, an error is recorded for boot disk 2 and the process ends. If time has not expired, the process returns to step 310.

Thus, if only one of the drives is unavailable, the invention still handles reads and writes. Only if both disks are unavailable will the system reach a device failure. Recording failures in the individual disks of the device enables a technician to replace a failed disk once the failure occurs. Since each disk is replaced as it fails, it is less likely that two disks will be unavailable at the same time. Since it is infrequent that both disks in the invention fail simultaneously, the computer system has less chance of being inoperable due to the unavailability of its boot drive.

Single Disk Failure Recovery

In the cases where either disk is unavailable above, it could be because that disk has failed or it could be that the disk has been removed from the invention. This means that when the disk becomes available again, it might not be an exact copy of the disk which remained accessible. This is because the inaccessible disk could have missed some write accesses or it could be an entirely new disk. FIG. 4 shows how an embodiment of the invention ensures that when the second disk becomes available, it is made into an exact copy of the first disk.

In FIG. 4, the invention detects that one disk is not accessible at step 400. At step 410, the invention's status LED indicates the failure and the system is notified. At step 420, the failed drive is replaced. At step 430, the new drive is brought online. At step 440, the controllers copy all the data to the replacement drive. This process is termed "resilvering" the drive. Thereafter, the system is completely recovered, having two redundant boot disks with both accessible to the system. Thus, at step 450, the status LED indicates the condition is normal.

Operating System Upgrades

The invention also provides an improved method for upgrading the operating systems of mission critical and other computer systems. One of the problems with upgrading operating systems is that if during the upgrade it becomes necessary to abandon the upgrade and restore the system to the original operating system, doing so may take several hours. As a result, if the technician doing the upgrade miscalculates, the system may be unable to run at a time when the user depends on the system being functional again. FIG. 5 illustrates a procedure the technician could use with an embodiment of the invention to reduce or eliminate the above problem.

At step 500, the system is halted so there is no device activity. At step 501, the technician removes one of the boot disks from the invention. Note that it does not matter which disk is removed since they are identical copies of each other. At step 502, that disk is set aside in case it is needed to restore the operating system later. At step 503, the technician places a new disk into the system. The old disk automatically mirrors its data to the new disk at step 504. Once mirroring is completed, the technician can move on to step 505, which is to begin the operating system upgrade. As the deadline for completion draws near, the technician must decide at step 506 whether the operating system upgrade can be completed in the time allowed. If it can, the upgrade continues to completion at step 507, at which point the invention contains two redundant boot disks with the new operating system.

If, however, the technician decides at any point of the upgrade that the upgrade cannot be completed by the deadline, the technician moves to step 508 and shuts down the system. Then, the technician removes both disks from the invention at step 509. At step 510, the technician inserts the disk removed at step 501 into the invention. Since that disk was not changed by the upgrade, it still boots up the old operating system. This enables the computer to be started up and be available for use at step 511. The technician can then insert a second disk into the invention at step 512. The data on the old disk automatically mirrors to the new disk at step 513. Once mirroring is complete, the system is completely restored at step 514. Thus, the system is running the original operating system and the invention has two identical boot disks.

Invention Architecture

To the host, the invention appears as only one target drive. In the embodiment of FIG. 6, the invention gives the host dual port access to the boot devices labeled boot device A and B respectively. The target drive has the same base world wide number (WWN) on both ports. This WWN is supplied by a component of the invention, not by either of the boot devices. Data is written to both boot devices, but is only read from the primary boot device. If the primary boot device fails, the data is read from the secondary boot device. Because the host sees the invention as only one boot device, which of the two boot devices is being read or written is unknown to the host.

The embodiment of FIG. 6 comprises two (2) power supplies indicated as power supply A and powers supply B coupled to two (2) port controllers indicated as port controller A and port controller B. The embodiment of FIG. 6 further comprises two (2) boot devices indicated as boot device A and boot device B, a firmware unit indicated as WWN, a set of LEDs indicated as LED and connections between those components. Having two (2) controllers, two (2) boot devices and two (2) power supplies allows for the use of dynamic multi-pathing (DMP) which, in turn, allows for dynamic reallocation (DR) in the system.

DMP involves having more than one path in which the data can follow to reach its destination. In the invention, the data can get to or from either boot device using either port controller. DR is the ability to remove and replace a component without shutting down the system. Due to the redundancy of the system and the ability to do DMP, the port controllers, boot devices and power sources can all be utilized by DR. Any one of an identical pair of components can be removed from the invention and replaced while the system is still running. A more thorough description of the components and their interactions follows.

Power Supplies

The power supplies are used to convert an external power source into current the invention's components can utilize. One embodiment of a power supply is capable of utilizing either a 48 vdc source or a 120–240 vac source. A power supply may contain a battery backup, but a battery backup is only necessary if data sent to the invention is staged in a cache and a "write complete" status signal is sent to the host before the data is committed to the disk. If data is written to both disks before sending the host a "write complete" message, no backup battery is necessary.

The power supply converts its power source to 12/5/3 vdc. This 12/5/3 vdc supply is connected in FIG. 6 from both power supplies to both disk drives, the LED component, and both of the controllers. Additionally, each power supply has two fans. Both fans run off the common 12 vdc. These fans serve to cool the power supplies, the controllers and the disk drives. The power supplies in FIG. 6 also have a data link between both controllers, the WWN unit and each other.

The power supplies described in connection with FIG. 6 are for purposes of example only. One skilled in the art will note that any power supply can be used to implement the present invention.

Boot Devices

The boot devices are essentially specialized storage devices (e.g. FCAL disk drives) that are used to store data in the form of an operating system. In FIG. 6, the two (2) drives are labeled boot device A and boot device B. Each boot device has a data path to both of the controllers. FIG. 7 illustrates that each of these paths connects to the controller's bus which in one embodiment is a I2C bus, then passes through a BY PASS unit before merging with the data path from the other disk drive for that controller and entering a QLogic unit.

LEDs and Firmware Components

The LED component is used to indicate the status of the invention during its operation. The LED component has data paths to both controllers.

The firmware supplies the WWN which is sent to the host. Thus, the WWN the host sees will not change even if one or both disk drives are changed. This component is attached to the frame mid-plane, which connects to both controllers. If this component is damaged, it can be removed and a blank component can be inserted and changed to the WWN in use through the serial port or an SES command.

Port Controllers

The port controllers are identical in design. The controllers take care of writing to both disks, mirroring an old disk to a new disk when a new disk is inserted and deciding which disk to read data from. FIG. 7 illustrates one embodiment of a port controller in more detail.

In FIG. 7, the connection to the host 700 comes through a gigabit interface converter (GBIC) 702 which connects to a QLogic unit 710. The QLogic unit labeled 710 connects to a data path which also connects to the controller's central processing unit (CPU) 707, a Cache Controller unit 711 and a second QLogic unit 713. The Cache Controller unit links to the Staging Cache unit 712. The QLogic unit 713 connects to a data path which splits into two paths. Each of those paths passes through a by pass unit 714 or 715, and then the frame mid-plane 716, on its way to one of the boot devices. All of the above mentioned connections are made via a 33 Mhz, 64 bit peripheral component interconnect (PCI) connection in FIG. 7. One should note, however, that the connections can be made by any mechanism well known to those skilled in the art.

The port controller also has a serial interface. This interface, which comes through RS232 unit 701, could connect to the host and be used to alert the host when a problem develops with one or more components of the invention. The RS232 unit connects to Serial unit 703. All administrative instructions from the system to the port controller pass through the Serial unit. Thus, administration of an embodiment of the present invention is accomplished without decreasing the rate data transmits through the GBIC unit 702. This Serial unit connects to a path which also connects to FRU-ID unit 705, a CPU memory unit 704, a Boot Flash unit 706, the CPU 707, a I2C unit 708 and a RX TX REG unit 709.

The I2C unit 708 connects to a path which passes through frame mid-plane 716 and connects to the power supplies, the WWN unit and the corresponding data path from the other controller. The I2C unit 708 monitors the function of the power supplies, the WWN unit and the other data controller so that if one of the above devices fails, a notification signal is sent through the RS232 unit 701. The RX TX REG unit 709 connects to a data path which passes through frame mid-plane 716 and connects to the LED component.

Thus, a method and apparatus for providing a reliable booting device is described in connection with one or more specific embodiments. The invention is defined by the claims and their full scope of equivalents.

What is claimed is:

1. A boot device for coupling to a computer system, comprising:
    a first storage device configured to store an operating system for booting the computer system; and
    a second storage device configured to store the operating system for booting the computer system;
    wherein said first storage device and said second storage device appear as a single target device to the computer system; and
    wherein the boot device is configured so the computer system can access the operating system from either the first storage device or the second storage device in event of a failure of one of the storage devices.

2. The boot device as recited in claim 1, wherein the boot device is configured to receive read accesses from the computer system for the single target device and respond with read data from either the first storage device or the second storage device.

3. The boot device as recited in claim 1, wherein the boot device is configured to send a read access to both the first storage device and the second storage device and return read data to the computer system from whichever of the first storage device and the second storage device responds first.

4. The boot device as recited in claim 1, wherein the boot device is configured to receive write data from the computer system for the single target device and store the data on both the first storage device and the second storage device.

5. The boot device as recited in claim 1, wherein the second storage device is configured as a complete mirror of the first storage device.

6. The boot device as recited in claim 1, wherein the boot device is configured to:
    detect a failure of one of the storage devices;
    receive a replacement storage device for the failed storage device; and
    mirror the non-failed one of the storage devices to the replacement storage device.

7. The boot device as recited in claim 6, wherein, in response to detecting the failure of one of the storage devices, the boot device is configured to automatically continue to allow the computer system to operate from the non-failed storage device while the failed storage device is being replaced and the replacement storage device is being mirrored from the non-failed storage device.

8. The boot device as recited in claim 1, further comprising:
    a first port for providing a first path from the computer system to the first and second storage devices; and
    a second port for providing a second path from the computer system to the first and second storage devices;
    wherein the boot device is configured to respond to accesses from the computer system on either port as said single target device.

9. The boot device as recited in claim 8, wherein both the first port and the second port are configured to have the same world wide number (WWN) to the computer system.

10. The boot device as recited in claim 8, wherein if one of the ports fails, the first and second storage devices can still be accessed through the other port.

11. The boot device as recited in claim 8, further comprising a serial interface separate from data paths to the first and second storage devices, wherein the serial interface is configured to communicate failure information to the computer system.

12. The boot device as recited in claim 1, further comprising a redundant power supply configured to supply power without interruption to the boot device if another power supply for the boot device fails.

13. The boot device as recited in claim 1, further comprising an LED component configured to indicate if one of the storage devices fails.

14. A computer system, comprising:
    a processor configured to execute an operating system; and
    a boot device coupled to the processor as a single target device, the boot device comprising:
        a first storage device configured to store the operating system; and
        a second storage device configured to store the operating system;
        wherein the boot device is configured so the computer system can access the operating system from either the first storage device or the second storage device in event of a failure of one of the storage devices.

15. The computer system as recited in claim 14, wherein the boot device is configured to receive read accesses from the processor for the single target device and respond with read data from either the first storage device or the second storage device.

16. The computer system as recited in claim 14, wherein the boot device is configured to send a read access from the processor to both the first storage device and the second storage device and return read data to the processor from whichever of the first storage device and the second storage device responds first.

17. The computer system as recited in claim 14, wherein the boot device is configured to receive write data from the processor for the single target device and store the data on both the first storage device and the second storage device.

18. The computer system as recited in claim 14, wherein the second storage device is configured as a complete mirror of the first storage device.

19. The computer system as recited in claim 14, wherein the boot device is configured to:
    detect a failure of one of the storage devices;
    receive a replacement storage device for the failed storage device; and
    mirror the non-failed one of the storage devices to the replacement storage device.

20. The computer system as recited in claim 19, wherein, in response to detecting the failure of one of the storage devices, the boot device is configured to automatically continue to allow the processor to operate from the non-failed storage device while the failed storage device is being replaced and the replacement storage device is being mirrored from the non-failed storage device.

21. The computer system as recited in claim 14, wherein the boot device further comprises:
    a first port for providing a first path to the first and second storage devices; and
    a second port for providing a second path to the first and second storage devices;
    wherein the boot device is configured to respond to accesses from the processor on either port as said single target device.

22. The computer system as recited in claim 21, wherein both the first port and the second port are configured to have the same world wide number (WWN) in the computer system.

23. The computer system as recited in claim 21, wherein if one of the ports fails, the first and second storage devices can still be accessed through the other port.

24. The computer system as recited in claim 21, wherein the boot device further comprises a serial interface separate from data paths to the first and second storage devices, wherein the serial interface is configured to communicate failure information to the processor.

25. The computer system as recited in claim 14, wherein the boot device further comprises a redundant power supply configured to supply power without interruption to the boot device if another power supply for the boot device fails.

26. The computer system as recited in claim 14, wherein the boot device further comprises an LED component configured to indicate if one of the storage devices fails.

27. A method, comprising:

storing an operating system on a first storage device and on a second storage device;

providing access to the operating system stored on both the first storage device and the second storage device as a single boot device;

detecting a failure of one of the storage devices; and upon said detecting, automatically continuing to provide access to the operating system stored on the non-failed one of the storage devices as the single boot device.

28. The method as recited in claim 27, further comprising mirroring all writes to the single boot device to both the first storage device and the second storage device.

29. The method as recited in claim 27, further comprising, in response to said detecting:

replacing the failed storage device with a replacement storage device; and copying all data from the non-failed storage device to the replacement storage device.

30. The method as recited in claim 27, further comprising:

removing the first storage device;

after removing the first storage device initiating an upgrade of the operating system stored on the second storage device;

determining if the upgrade successfully completes;

if the upgrade does not successfully complete, replacing the first storage device and restoring the operating system from the first storage device.

* * * * *